United States Patent [19]

Reinartz et al.

[11] Patent Number: 5,297,862
[45] Date of Patent: Mar. 29, 1994

[54] HYDRAULIC BRAKE SYSTEM CONTROLLING SLIP

[75] Inventors: Hans D. Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 852,136

[22] PCT Filed: Jul. 3, 1991

[86] PCT No.: PCT/EP91/01243

§ 371 Date: Apr. 29, 1992

§ 102(e) Date: Apr. 29, 1992

[87] PCT Pub. No.: WO92/04215

PCT Pub. Date: Mar. 19, 1992

[30] Foreign Application Priority Data

Aug. 31, 1990 [DE] Fed. Rep. of Germany ....... 4027565

[51] Int. Cl.$^5$ .............................. B60T 8/48; B60T 8/32
[52] U.S. Cl. .............................. 303/116.1; 303/115.4; 303/113.1; 303/901
[58] Field of Search ............... 303/116.1, 113.2, 115.4, 303/116.2, 119.1, DIG. 4, 901, 113.1; 364/426.01, 426.02

[56] References Cited

U.S. PATENT DOCUMENTS

| 3,574,416 | 4/1971 | Skoyles | 303/21 X |
| 4,401,348 | 8/1983 | Farr | 303/116 |
| 4,685,747 | 8/1987 | Belart et al. | 303/901 X |
| 4,729,611 | 3/1988 | Kircher et al. | 303/116.1 |
| 4,950,038 | 8/1990 | Ocvirk et al. | 303/113.2 |
| 5,002,345 | 3/1991 | Becker | 303/901 X |
| 5,058,961 | 10/1991 | Mergenthaler et al. | 303/116.2 X |

FOREIGN PATENT DOCUMENTS

| 0253157 | 1/1988 | European Pat. Off. |
| 3601769 | 7/1987 | Fed. Rep. of Germany |
| 3626679 | 2/1988 | Fed. Rep. of Germany |
| 3731636 | 4/1989 | Fed. Rep. of Germany |
| 3844126 | 7/1989 | Fed. Rep. of Germany |
| 3903532 | 8/1989 | Fed. Rep. of Germany |
| 3819812 | 12/1989 | Fed. Rep. of Germany |
| 0113545 | 5/1986 | Japan |
| 301448 | 12/1989 | Japan |
| 2186647 | 8/1987 | United Kingdom |

Primary Examiner—Robert J. Oberleitner
Assistant Examiner—Peter M. Poon
Attorney, Agent, or Firm—Robert P. Seitter; J. Gordon Lewis

[57] ABSTRACT

To insure that no air bubbles are included in a pump of an anti-locking system, the pump is placed into the master brake conduit, thereby causing it to be scavenged by manual brake operation. Once a brake pressure of about 5 bar is attained, a switch-over valve (28) is switched-over, causing the master brake conduit in the pressure build-up direction to be blocked. Additionally pressure fluid is supplied to the secondary conduit (26) and a pressure opening valve (27). The pressure decrease is effected through the direct conduit (13). In the event of a brake slip control, the pump takes in pressure fluid from the reservoir (25) through the suction valve (22).

10 Claims, 1 Drawing Sheet

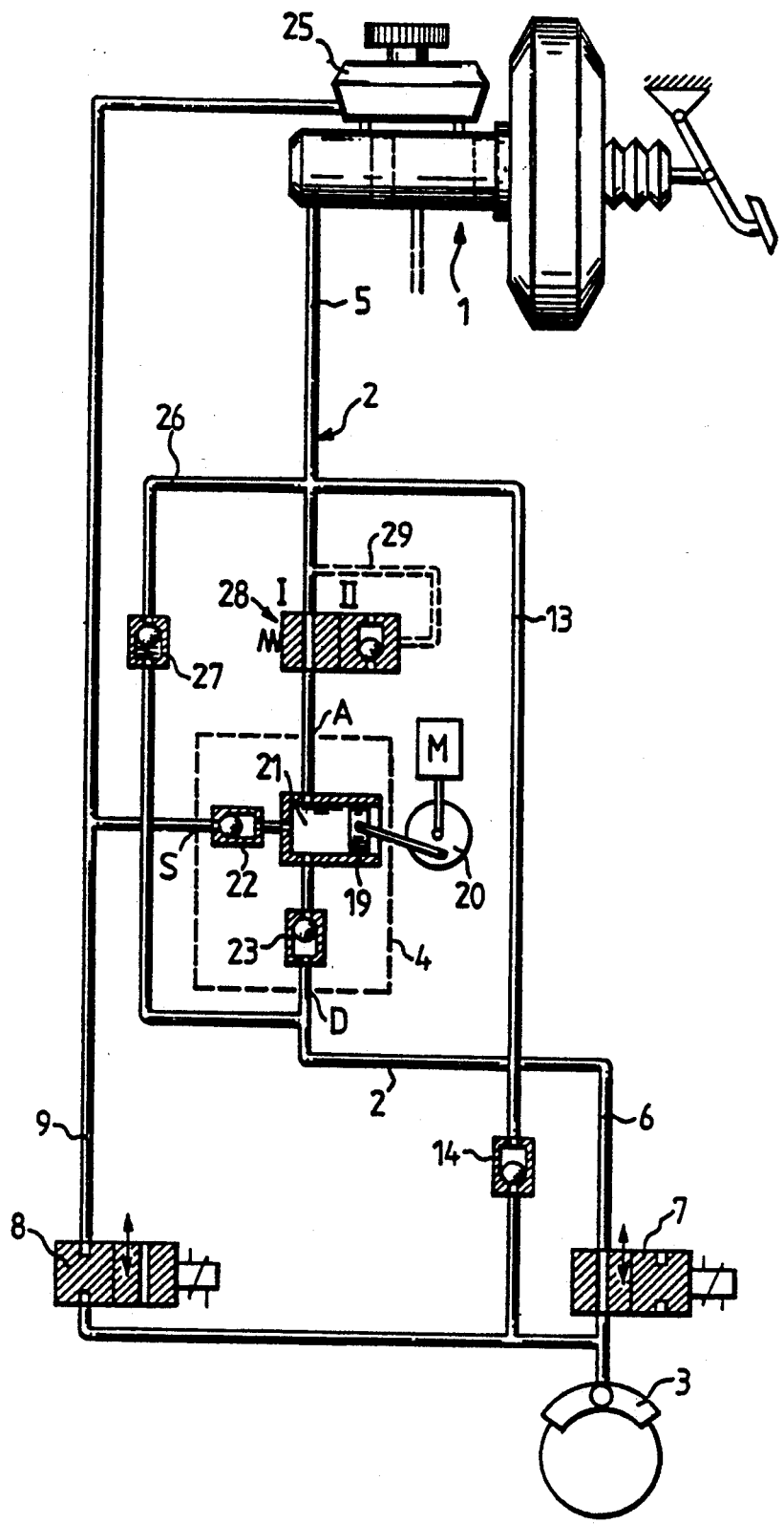

HYDRAULIC BRAKE SYSTEM CONTROLLING SLIP

BACKGROUND OF THE INVENTION

A brake system of the type with which the present invention is concerned is described in German Patent application No. P 40 00 837.1 and copending U.S. patent application Ser. No. 07/638,927, filed on Jan. 9, 1991. The pump is located in the brake conduit connecting the master cylinder and wheel cylinder and separated from the master cylinder upon commencement of a slip control operation. The separation is performed by an electromagnetically actuated separating valve.

If the separating valve were not activated, this would result in the master brake cylinder being evacuated during a control operation. Switching of the separating valve hence, is thus absolutely necessary prior to a control operation. Accordingly, it is readily apparent that the switch-over operation of the separating valve must be monitored.

It is, therefore an object of the invention to provide an improved brake system of this type in which the need for an electromagnetically actuated separating valve is eliminated while insuring a reliably operating system.

SUMMARY OF THE INVENTION

This object is achieved by providing a switch over valve operated by development of a predetermined master cylinder pressure to block flow from the master cylinder to the pump chamber. A pressure opened valve is in a secondary conduit bypassing the pump, which valve opens at a lesser pressure than that necessary to operate the switch over valve.

By arrangement, the pump is scavenged only upon commencement of a braking operation, which is adequate to avoid the formation of air bubbles within the pump. Once a predetermined pressure level, for example 5 bar, has been reached, the brake conduit is closed and the further supply of brake fluid to the wheel brakes takes place through the secondary conduit by opening of the pressure operated valve.

During an antislip control process, the pump, through a separate intake nozzle, will take in pressure fluid from a reservoir.

DESCRIPTION OF THE DRAWING

The FIGURE is a schematic diagram of a hydraulic brake system according to the present invention.

DETAILED DESCRIPTION

The principle of the invention will now be described in greater detail with reference to one embodiment shown in the FIGURE. The brake system comprises a master cylinder 1, to which are connected, through a brake conduit 2, one or more wheel brakes 3, each including a wheel cylinder. A pump 4, described hereinafter in greater detail, is installed in series in the brake conduit 2, with a connection A, through a first brake conduit section 5, being in fluid communication with the master brake cylinder 1. The pressure side D thereof, through a second brake conduit section 6, is in fluid communication with the cylinder of the wheel brake 3.

The second brake conduit section 6 has installed therein an inlet valve 7, which is electromagnetically actuated. In a basic position thereof, inlet valve 7 keeps open the conduit 6, and in a switching position, it blocks the conduit 6.

The cylinder of the wheel brake 3, through a return conduit 9, is in fluid communication with a pressure fluid collector, with an electromagnetically operated outlet valve 8 installed in the return conduit 9. Outlet valve 8 in a basic condition thereof, blocks the return conduit 9 and, in a switching position thereof opens the return conduit 9.

A pressure fluid reservoir 25 and master brake cylinder 1 are in pressure fluid communication whenever the pedal is not depressed. The reservoir 25, through a suction valve 22, is also in communication with the pump chamber 21.

The wheel brake cylinder, through a direct conduit 13, is in direct communication with the master brake cylinder 1. The direct conduit 13 is provided with a check valve 14, opening toward the master brake cylinder 1.

The pump 4 according to the embodiment shown in the FIGURE, is in the form of a piston pump, the piston 19 of which is actuated through a motor-driven eccentric 20. The pump chamber 21, defined forward of the pump piston 19, through respective check valves 22 and 23, with the intake side S and the pressure side D of the pump 4 respectively. The check valve 22 opens toward the pump chamber, while the check valve 23 blocks flow toward the pump chamber 21.

Installed in the brake conduit section 5 is a switch-over valve 28, having two switching positions. In a first switching position I, the brake conduit 5 is open, while in a second switching position II, a check valve is caused to become effective in the brake conduit, which check valve blocks flow toward the pump 4. The switch-over valve 28, is operated by the master cylinder pressure, acting through a control conduit 29 and against the pressure of a spring, to be brought from the first switching position into the second switching position. The preloading force of the spring approximately corresponds to a switch-over pressure of 5 bar.

Installed in parallel to the switch-over valve 28 and the pump 4, is a pressure opening valve 27 in a secondary conduit 26, which pressure retaining valve opens at a pressure of about 2 bar. The secondary conduit 26 connects the master brake cylinder 1 directly to the inlet valve 7.

The pump chamber 21, hence, has three connections, a connection A to the master brake cylinder 1, a connection D to the cylinder of the wheel brake 3, and a connection S to the pressure fluid reservoir 25.

The operation of the brake system as shown is as follows:

1. Non-controlled Deceleration

Upon actuation of the symbolically shown pedal, pressure fluid is displaced from the master brake cylinder 1 into the cylinder of the wheel brake 3. The pressure fluid path leads through the open switch-over valve 28, the pump chamber 21, the second check valve 23 and the open inlet valve 7. A pressure is developed in the cylinder of the wheel brake 3 which results in a wheel deceleration and, consequently, in a deceleration of the automotive vehicle. Once the pedal is released, pressure fluid will flow from the cylinder of wheel brake 3 via the opening check valve 14 through the direct conduit 13 back into the master brake cylinder 1. What is important is that the pressure build-up path, during normal brake operation, leads through the pump chamber 21.

The switch-over valve 28 will switch-over at a pressure of about 5 bar in the brake conduit. Thereafter, the brake conduit 2 is blocked in the pressure build-up direction. The continued pressure build-up now is effected through the secondary conduit 26 and the pressure opening valve 27. This valve functions to block the secondary conduit 26 as long as the main conduit 2 is still open.

2. Controlled Deceleration

The rotation of the wheel to be decelerated is permanently monitored by means of sensor not shown. An electronic analyzer, also not shown, received the sensor signals to be able to immediately determine once the wheel tends to lock. Upon this occurrence, the analyzer initiates the following activities: Initially the inlet valve 7 is switched so that the brake conduit 6 is blocked. The outlet valve 8 is opened so that pressure fluid can be discharged from the cylinder of the wheel brake 3 into the pressure fluid reservoir 25. The pump drive M is actuated so that the pump 4 takes in pressure fluid from the pressure fluid reservoir 25 through the suction valve 22. The pressure fluid is passed, if the inlet valve 7 is opened, to the cylinder of the wheel brake 3 and, through the reswitched switch-over valve 28, into the master brake cylinder 1, whence it flow back to the reservoir 25 through the central valves formed as control valves.

By successively switching the inlet valve 7 and the outlet valve 8, fluid pressure can be supplied to and discharged from the cylinder of the wheel brake. This will be effected according to a predetermined algorithm to thereby adjust an optimum slip valve on the wheel. the pressure in the wheel brake, through the direct conduit 13, is confined to the pressure in the master brake cylinder. Once the drive reduces the pedal force, the pressure in the wheel brake cylinder will decrease so that the brake operation, is terminated.

We claim:

1. A hydraulic brake system including means for controlling wheel slip, comprising: a brake pedal, a brake pedal-actuated master brake cylinder, at least one wheel brake cylinder, a brake conduit placing said wheel brake cylinder in communication with said master brake cylinder; pressure fluid in said system, which pressure fluid, upon actuation of said brake pedal, is displaced from said master brake cylinder through said brake conduit, and into said wheel brake cylinder; further comprising a hydraulic pump installed into said brake conduit, said pump including a pump chamber connected by a first section of said conduit to said master brake cylinder and by a second section of said brake conduit to said wheel brake cylinder, said pump chamber thereby connected in series in said brake conduit between said master cylinder and said wheel cylinder to cause pressurization thereof upon actuation of said brake pedal, a switch valve provided in said first section of said brake conduit between said master brake cylinder and said pump chamber, said switch valve having a first position opening said first section of said brake conduit and, a second position blocking said first section of said brake conduit against fluid flow towards said pump chamber, said switch valve including means responsive to development of a predetermined master brake cylinder fluid pressure to be switched from said first swithing position into said second switching position, and a secondary conduit connected to said brake conduit to allow bypassing of said pump chamber of said fluid displaced by said master cylinder by actuation of said brake pedal when said switch valve is in said second position.

2. A brake system according to claim 1, further including a pressure opening valve interposed in said secondary conduit, said pressure opening valve opening toward said wheel brake cylinder upon development of a predetermined master brake cylinder fluid pressure.

3. A brake system according to claim 2, wherein said pressure opening valve opens at a master cylinder pressure level less than the pressure level causing switching of said switch valve.

4. A brake system according to claim 1, wherein said switch valve is switched over at a master cylinder fluid pressure of about 5 bar.

5. A brake system according to claim 1, including a return conduit leading from said wheel brake cylinder and a pressure fluid collector connected to said return conduit said pump having a suction valve and a fluid connection to said return with said suction valve in said fluid connection.

6. A hydraulic brake system for controlling wheel slip in an automotive vehicle, said system comprising a brake pedal, a master cylinder generating fluid pressure by application of said brake pedal, a wheel brake including a wheel brake cylinder, a hydraulic circuit including a brake conduit connecting said master cylinder and said wheel brake cylinder allowing operation of said wheel brake with said brake pedal, a low pressure reservoir for supplying fluid to said hydraulic circuit and master cylinder, a return line connecting said wheel brake cylinder and said reservoir;

said system further including an electromagnetically operated normally open inlet valve interposed in said circuit to allow controlled blocking of said brake conduit, and an electromagnetically operated normally closed outlet valve in said return line allowing controlled opening of said return conduit;

a pump having a pump chamber;

a drive means for driving said pump upon energization thereof, said pump chamber interposed in said brake conduit to be connected both to said master cylinder and said wheel brake cylinder;

a fluid connection between said pump chamber and said return line;

a first one way valve opening only to fluid flow out of said pump chamber interposed between said pump chamber and said wheel brake cylinder;

a second one way valve opening to fluid flow into said pump chamber interposed in said fluid connection to said return line;

switch valve means interposed in said brake conduit between said master cylinder and said pump chamber, said switch valve means having a normally open condition allowing fluid flow to said pump chamber and a switched blocked condition blocking flow to said pump chamber, said switch valve means including means causing switching from said open to said blocked condition upon development of a predetermined level of fluid pressure by said master cylinder;

a secondary conduit connected to said brake conduit between said switch valve means and said master cylinder and connected into said brake conduit at a point between said first one way valve and said wheel brake cylinder; and a normally closed pressure opening valve in said secondary conduit opening said secondary conduit upon development of a predetermined fluid pressure by said master cylinder less than said predetermined pressure operating said switch valve means.

7. The system according to claim 6, further including a direct conduit directly connecting said wheel brake cylinder and said brake conduit at a point between said master cylinder and said switch valve means, and a third one way acting valve in said direct conduit opening to flow out from said wheel brake cylinder.

8. The system according to claim 6, wherein said pressure opening valve acts to block flow in said secondary conduit, towards said master cylinder.

9. The system according to claim 6, wherein said switch valve means includes valve means allowing flow towards said master cylinder in said blocked condition of said switch valve means.

10. The system according to claim 6, wherein said switch valve means is operated by a master cylinder pressure on the order of 5 bar and pressure valve is operated by a master cylinder pressure on the order of 2 bar.

* * * * *